(No Model.)
H. M. GREEN.
SEPARATOR SHOE FOR THRASHING MACHINES.
No. 262,405. Patented Aug. 8, 1882.
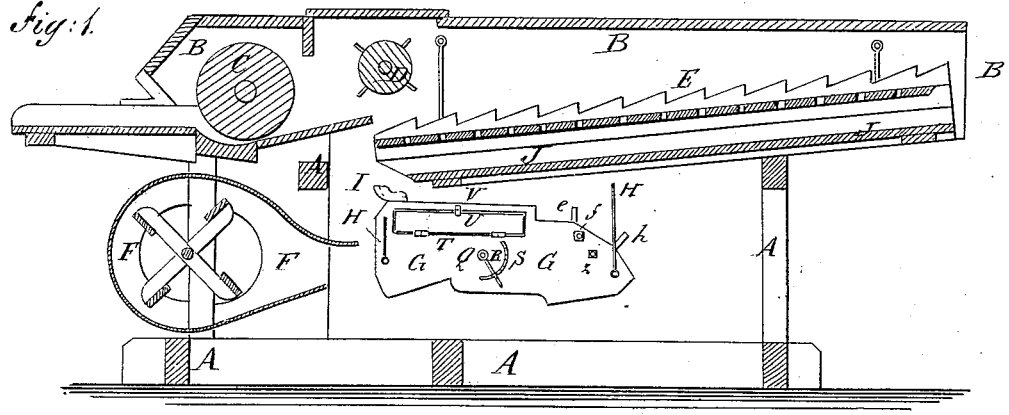
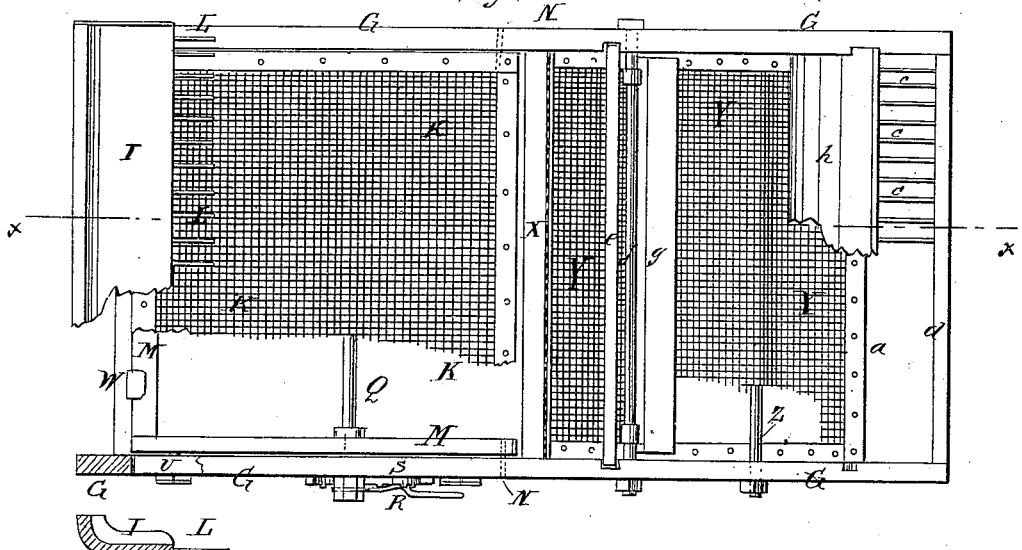
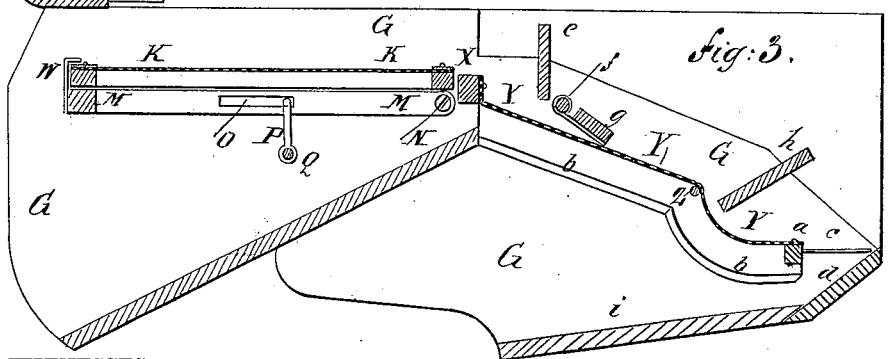
WITNESSES:
Chas. Nida
C. Sedgwick
INVENTOR:
H. M. Green
BY Munn & Co
ATTORNEYS.

UNITED STATES PATENT OFFICE.

HENRY M. GREEN, OF LOWELL, WISCONSIN.

SEPARATOR-SHOE FOR THRASHING-MACHINES.

SPECIFICATION forming part of Letters Patent No. 262,405, dated August 8, 1882.

Application filed December 16, 1881. (No model.)

*To all whom it may concern:*

Be it known that I, HENRY MYRON GREEN, of Lowell, in the county of Dodge and State of Wisconsin, have invented certain new and useful Improvements in Separator-Shoes for Thrashing-Machines, of which the following is a full, clear, and exact description.

Reference is to be had to the accompanying drawings, forming part of this specification, in which similar letters of reference indicate corresponding parts in all the figures.

Figure 1 is a side elevation of my improvement shown as applied to a thrashing-machine. Fig. 2 is a plan view of the improvement, parts being broken away. Fig. 3 is a sectional side elevation of the same, taken through the line *x x*, Fig. 2.

The object of this invention is to prevent grain from being carried over the tail-board of a thrashing-machine grain-cleaner with the straw, and thus wasted, and also to prevent the sieve from clogging or filling up.

A represents the frame, B the casing, C the thrashing-cylinder, D the beater, E the straw carrier or separator, and F the fan-blower, of an ordinary thrashing-machine.

G is the shoe, which is supported by the hinged rods H, secured to it and to the frame A or casing B, and is shaken from the driving mechanism in the ordinary manner.

I is the board, apron, or spout that receives the grain from the inclined bottom J of the separator and guides it to the sieve K.

To the lower edge of the feed-board I are attached fingers L, which carry the chaff and coarse trash to the rearward of the forward end of the sieve K, while allowing the grain to drop through and bring the said chaff and trash into a more favorable position to be acted upon by the air-blast from the fan-blower F. The sieve K rests upon a frame, M, formed of two side bars connected at their forward ends by a cross-bar. The rear ends of the side bars of the frame M are hinged by pins or bolts N to the sides of the shoe G, so that the forward end of the sieve K can be raised and lowered freely.

In the middle parts of the side bars of the frame M are formed longitudinal slots O, as shown in Fig. 3, to receive the cranks P, attached to the rod Q, which works in bearings in the sides of the shoe G, so that by rocking the rod Q the frame M, and with it the sieve K, can be raised and lowered to adjust the sieve K in a level position, or with its forward end inclined downward, as may be required. One end of the rod Q projects, and to it is attached a crank, R, by means of which the said rod is rocked to adjust the sieve K. The crank R is made elastic, and moves along a toothed or notched catch-bar, S, attached to the side of the shoe G, so that the said crank R will be held securely in any position into which it may be adjusted, and can be readily moved to adjust the sieve K.

In the upper part of one side of the shoe G, directly opposite the sieve K, when in a level position, is formed an opening, T, through which the sieve K can be readily taken out and inserted. The opening T is closed by a door, U, hinged at its lower edge to the side of the shoe G, and secured in place, when closed, by a button, V, or other suitable fastening. The sieve K is held from moving forward and its forward end is held from rising from the cross-bar of the hinged frame M by the stop-hooks W, attached to the cross-bar of the said frame M, and which overlap the upper side of the forward bar of the sieve K. The rear end of the sieve K rests against a cross-bar, X, attached to the shoe G, and to the rear side of which is attached the upper end of the screen Y. The screen Y extends rearward and downward through a rearward extension of the shoe G, and is bent downward at an angle over a rod, Z, attached to the sides of the shoe G. From the rod Z the screen Y inclines or curves downward and rearward, and its rear end is attached to a cross-bar, *a*, secured at its ends to the sides of the shoe G. The side edges of the screen Y are attached to the sides of the shoe G or to cleats *b*, attached to the said sides.

To the cross-bar *a* are attached rake teeth or fingers *c*, which extend to the tail-board *d* of the shoe G to guide all straw and coarse trash over the said tail-board.

In vertical grooves in the sides of the shoe G are inserted the ends of a tail-board, *e*, to receive the straw and grain that pass from the rear end of the sieve K and cause them to fall upon the screen Y, through which the grain passes, while the straw and the unthrashed heads of the grain pass down the screen Y beneath the lower edge of the said tail-board *e*. With this construction an open space is left between the back end of the main sieve K and the tail-board e, through which the chaff and grain from the main sieve K drop to the inclined screen Y, so that the chaff will not back up upon and clog the main sieve K.

To a rod, f, attached to the sides of the shoe G, a little in the rear of the tail-board e, is hinged the upper edge of an inclined board, g. The lower edge of the board g rests upon the screen Y; or the said hinged board g can be secured by pins or other suitable means with its lower edge at any desired distance above the screen Y. The hinged board g is designed to prevent the kernels of grain that may pass from the sieve K to the inclined screen Y from bounding off the said screen.

In inclined grooves in the sides of the shoe G, a little in the rear of the angle of the screen Y, is placed a tail-board, h, which may be adjusted with its lower edge at any desired distance from the screen Y, and is designed to keep the straw, unthrashed grain-heads, and any kernels of grain that may still be among the straw close to the screen Y as they pass down its lower part. At the rear end of the shoe G the unthrashed heads of grain and any kernels that may still be with the straw fall through the rake c, while the straw passes over the said rake and falls to the ground. The grain that passes through the screen Y and the rake c, and the heads of unthrashed grain that pass through the rake c, fall upon the screen-board i and slide down the said screen-board into the tailings-spout, (which is not shown in the drawings,) and from which they pass to an elevator to be carried to the thrashing-cylinder to again pass through the machine.

Having thus fully described my invention, I claim as new and desire to secure by Letters Patent—

1. In a thrashing-machine, the combination, with the shoe G, the sieve K, and the hinged frame M, of the hooks W and the cross-bars X, substantially as herein shown and described, whereby the said sieve is kept in place, as set forth.

2. The combination, with the sieve K, of the crank-rod P Q R and the frame M, hinged to the sides of shoe G, and having longitudinal slots O to allow it to be actuated by the said crank-rod for adjusting the sieve, as described.

3. The combination, with the shoe G, of the screen Y, rod Z, bar a, having fingers c, the tail-boards d e h, and hinged board g, as and for the purpose specified.

HENRY MYRON GREEN.

Witnesses:
D. F. ELDRED,
F. W. STEPHENSON.